Patented Sept. 18, 1951

2,568,555

UNITED STATES PATENT OFFICE 2,568,555

1-NITROPHENYL-2-ACYLAMINO-1,3-PROPANEDIOL ACETALS

Allen C. Moore, Grosse Pointe Woods, Mich., assignor to Parke, Davis & Company, Detroit, Mich., a corporation of Michigan No Drawing. Application August 31, 1950, Serial No. 182,621

8 Claims. (Cl. 260—338)

This invention relates to heterocyclic compounds which possess valuable antibiotic properties and to methods for obtaining the same. More particularly, the invention relates to 1,3-dioxane compounds having the formula,

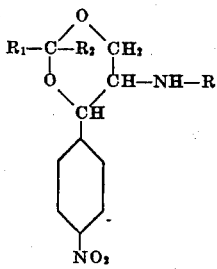

where R is a halogenated lower aliphatic carboxylic acid acyl radical and $R_1$ and $R_2$ are the same or different and represent hydrogen, lower alkyl, phenyl or phenalkyl radicals.

It will be apparent to those skilled in the art that the products of the invention, as well as the acylamido diol compounds used as starting materials for their production, exist in structural or diastereoisomeric as well as optical isomeric form. The term "structural" isomer or form as used herein refers to the cis or trans, that is, the planar relationship of the p-nitrophenyl and —NH—R groups to the plane of the dioxane ring. To differentiate between these two diastereoisomers the cis compounds will subsequently be referred to as the "regular" (reg.) series or form and the trans diastereoisomers as the "pseudo" ($\psi$) series or form. Such cis compounds are those products wherein both the p-nitrophenyl and —NH—R groups are on the same side of the plane of the dioxane ring.

Both the regular and pseudo forms exist as racemates of the optically active dextro (d) and levo (l) rotary isomers as well as in the form of the individual or separate dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

In accordance with the invention, 1,3-dioxane compounds having the above general formula are produced by reacting an acylamido diol compound of formula,

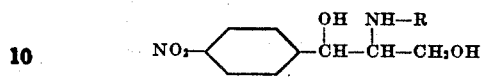

under anhydrous conditions in the presence of a dehydrating agent with a carbonyl compound of formula,

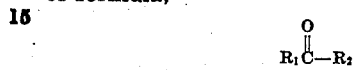

where R, $R_1$ and $R_2$ have the same significance as given above. As dehydrating agents phosphorus pentoxide, concentrated sulfuric acid, syrupy phosphoric acid, gaseous hydrogen chloride and gaseous hydrogen bromide are particularly suitable. In carrying out the reaction the temperature should be kept below about 60° C. and preferably in the range of 20 to 45° C. A solvent for the reaction can be used if desired but in most cases it is more expedient to simply use an excess of the carbonyl compound as the reaction medium. In the case of very low boiling carbonyl compounds or carbonyl compounds in which the acylamido diols are not soluble, it is preferable to use an inert, anhydrous, organic solvent such as methylene dichloride, carbon tetrachloride, ethylene dichloride, chloroform and the like. Where the carbonyl compounds exist in polymeric form such as paraformaldehyde, metaldehyde and paraldehyde they can be employed in this form as the free monomeric carbonyl compound is liberated in situ and is available for reaction.

The products of the invention possess valuable antibiotic properties. They are effective against a wide variety of micro-organisms and can be used in the treatment of such diseases and conditions as typhus, typhoid, pertussis, Rocky Mountain spotted fever, urinary tract infections and the like. They are tasteless and hence can be administered orally in the form of uncoated pills or incorporated into syrups and candies suitable for administration to young children. They are relatively non-toxic and are sufficiently stable to permit their use in syrups without loss of their antibiotic activity.

The invention is illustrated by the following examples.

Example 1

(a) 5 g. of phosphorus pentoxide is added to a solution of 10 g. of (l)-$\psi$-1-p-nitrophenyl-2- dichloroacetamidopropane-1,3-diol in 250 cc. of dry acetone under anhydrous conditions at room temperature. The mixture is allowed to stand for one-half hour and then the solution decanted from the gummy residue. The solution is stirred with anhydrous sodium carbonate until neutral (about one hour) and then filtered. The filtrate is evaporated to dryness and the crystalline residue taken up in and recrystallized from dilute ethanol. Recrystallization from ethanol yields the desired (l)-ψ-2,2-dimethyl-4-p-nitrophenyl-5-dichloroacetamido-1,3-dioxane in pure form; M. P. 149° C.; $(a)_D^{25} = -8°$ in ethanol. The formula of this product is,

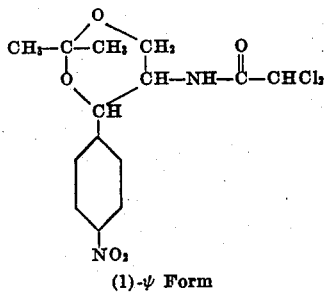

(1)-ψ Form (b) A solution consisting of 10 g. of (l)-ψ-1-p-nitrophenyl - 2 - dichloroacetamidopropane - 1,3-diol, 250 cc. of dry acetone and 1 cc. of concentrated sulfuric acid is allowed to stand at room temperature under anhydrous conditions for twenty hours. At the end of this time the reaction mixture is shaken with an excess of dry sodium carbonate until neutral. The reaction mixture is filtered and the filtrate evaporated to dryness. The residue is taken up in and recrystallized from dilute ethanol and finally from ethanol. The (l)-ψ-2,2-dimethyl - 4 - p - nitrophenyl-5-dichloroacetamido - 1,3 - dioxane so obtained melts at 146° C. Further recrystallization from ethanol raises the melting point to 149° C. This product is identical with that prepared by the method described in (a) above.

*Example 2*

(a) 5 g. of phosphorus pentoxide is added to a solution of 10 g. of (d)-ψ-1-p-nitrophenyl-2-dichloroacetamidopropane-1,3-diol in 75 cc. of dry acetone under anhydrous conditions at room temperature. The reaction mixture is allowed to stand for one-half hour at room temperature and then the solution decanted from the gummy residue. The solution is stirred with anhydrous sodium carbonate until neutral (about one hour) and then filtered. The filtrate is evaporated to dryness and the crystalline residue taken up in and recrystallized from dilute ethanol. Recrystallization from ethanol yields the desired (d)-ψ-2,2 - dimethyl-4-p-nitrophenyl - 5 - dichloroacetamido-1,3-dioxane in pure form; M. P. 149° C.; $(a)_D^{25} = +8°$ in ethanol. The formula of this product is:

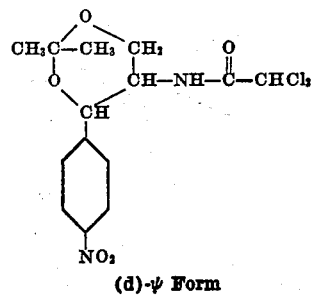

(d)-ψ Form (b) A solution consisting of 10 g. of (d)-ψ-1-p-nitrophenyl-2-dichloroacetamidopropane - 1,3-diol, 250 cc. of dry acetone and 1 cc. of concentrated sulfuric acid is allowed to stand at room temperature under anhydrous conditions for twenty hours. At the end of this time the reaction mixture is neutralized by bubbling dry ammonia gas through the solution. The mixture is filtered to remove the ammonium sulfate and the filtrate evaporated to dryness in a blast of air. The residual oil is taken up in and recrystallized from dilute ethanol. The (d)-ψ-2,2-dimethyl-4-p - nitrophenyl - 5 - dichloroacetamido - 1,3 - dioxane so obtained melts at 148° C. and is identical with that obtained by method (a).

*Example 3*

7.5 g. of phosphorus pentoxide is added to a solution of 15 g. of (dl)-ψ-1-p-nitrophenyl-2-dichloroacetamidopropane-1,3-diol in 350 cc. of dry acetone under anhydrous conditions at room temperature. The reaction mixture is allowed to stand for one-half hour and the solution decanted from the gummy residue. The solution is neutralized by stirring with solid anhydrous sodium carbonate. The solution is separated from the insoluble material and evaporated to dryness. The crystalline residue which consists of (dl)-ψ-2,2 - dimethyl - 4 - p - nitrophenyl - 5 - dichloroacetamido-1,3-dioxane is taken up in and crystallized from dilute ethanol; M. P. 152–3° C. The formula of this product is,

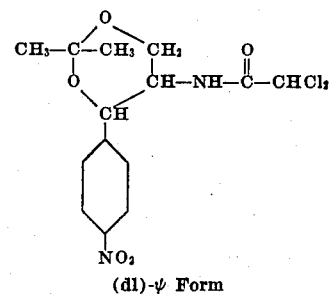

(dl)-ψ Form

*Example 4*

3 g. of phosphorus pentoxide is added to a solution of 7.5 g. of (dl)-reg.-1-p-nitrophenyl-2-dichloroacetamidopropane-1,3-diol in 175 cc. of dry acetone under anhydrous conditions at room temperature. The reaction mixture is allowed to stand at room temperature for one-half hour and then the solution decanted from the gummy residue. The solution is neutralized by stirring with anhydrous sodium carbonate, the insoluble matter separated and the clear solution evaporated to dryness in vacuo. The residue which consists of the desired (dl)-reg.-2,2-dimethyl-4-p-nitrophenyl-5-dichloroacetamido-1,3-dioxane is taken up in and purified by recrystallization from dilute ethanol. The formula of this product is,

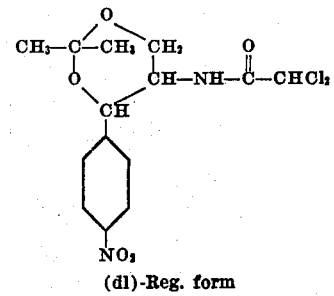

(dl)-Reg. form

Example 5

4 g. of phosphorus pentoxide is added to a solution consisting of 50 cc. of paraldehyde, 5 g. of (l)-ψ-1-p-nitrophenyl-2-dichloroacetamidopropane-1,3-diol and 100 cc. of ethylene dichloride at room temperature under anhydrous conditions. The reaction mixture is allowed to stand for about one-half hour and then the solution decanted from the brownish-black gummy residue. The solution is stirred with anhydrous sodium carbonate until neutral and filtered. The solvent is evaporated from the filtrate and the oily residue taken up in methanol and crystallized by the addition of water. The crystalline (l)-ψ-2-methyl-4-p-nitrophenyl-5-dichloroacetamido-1,3-dioxane is obtained in pure form by recrystallization of the product from dilute methanol; M. P. 129–30° C.; $(\alpha)_D^{25} = -15°$ in ethanol. The formula of this product is,

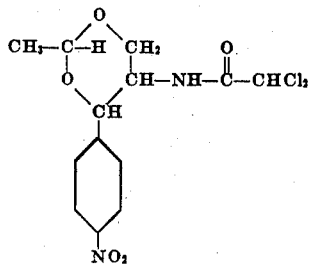

(l)-ψ Form

Example 6

4 g. of phosphorus pentoxide is added to a solution containing 5 g. of (dl)-ψ-1-p-nitrophenyl-2-dibromoacetamidopropane-1,3-diol and 5 g. of benzaldehyde in 100 cc. of ethylene dichloride. The reaction mixture is allowed to stand for one-half hour at room temperature under anhydrous conditions and then the solution decanted from the gummy residue. The solution is stirred with anhydrous sodium carbonate until neutral and then filtered. The filtrate is evaporated to dryness and the crystalline residue taken up in and recrystallized from dilute methanol. Recrystallization from methanol yields the desired (dl)-ψ-2-phenyl-4-p-nitrophenyl-5-dibromoacetamido-1,3-dioxane in pure form. The formula of this product is,

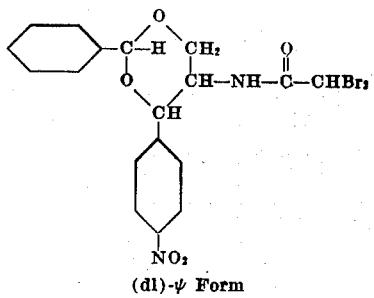

(dl)-ψ Form

Example 7

3 g. of phosphorus pentoxide is added to a solution of 5 g. of (dl)-ψ-1-p-nitrophenyl-2-bromoacetamidopropane-1,3-diol and 5 g. of β-phenylpropionaldehyde in 150 cc. of ethylene dichloride. The reaction mixture is allowed to stand for one-half hour under anhydrous conditions at room temperature and then the solution decanted from the gummy residue. The solution is stirred with anhydrous potassium carbonate until neutral and then filtered. The filtrate is evaporated to dryness in vacuo and the residue taken up in and crystallized from dilute ethanol. Recrystallization of the product from ethanol yields the desired (dl)-ψ-2-phenethyl-4-p-nitrophenyl-5-bromoacetamido-1,3-dioxane in pure form. The formula of this product is,

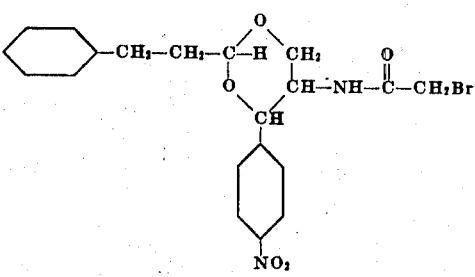

(dl)-ψ Form

Example 8

5 g. of phosphorus pentoxide is added to a solution of 10 g. of (dl)-ψ-1-p-nitrophenyl-2-α-chloroacetamidopropane-1,3-diol in 250 cc. of methyl ethyl ketone under anhydrous conditions at room temperature. The mixture is allowed to stand for one-half hour under anhydrous conditions and then the solution decanted from the gummy residue. The solution is stirred with anhydrous sodium carbonate until neutral and then filtered. The filtrate is evaporated to dryness and the crystalline residue taken up in and recrystallized from dilute ethanol. Recrystalization from ethanol yields the desired (dl)-ψ-2-ethyl-2-methyl-4-p-nitrophenyl-5-α-chloropropionamido-1,3-dioxane in pure form. The formula of this product is,

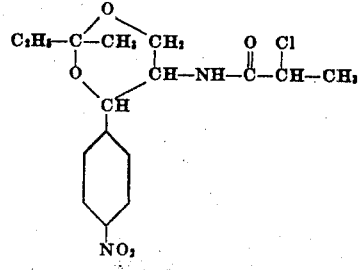

(dl)-ψ Form

Example 9

4 g. of phosphorus pentoxide is added to a solution of 10 g. of (dl)-reg.-1-p-nitrophenyl-2-difluoroacetamidopropane-1,3-diol in 250 cc. of diethyl ketone under anhydrous conditions at room temperature. The reaction mixture is allowed to stand for one-half hour under anhydrous conditions and then the solution decanted from the gummy residue. The solution is stirred with anhydrous sodium carbonate until neutral and then filtered. The filtrate is evaporated to dryness and the crystalline residue taken up in and recrystallized from dilute ethanol. Recrystallization from ethanol yields the desired (dl)-reg.-2,2-diethyl-4-p-nitrophenyl-5-difluoroacetamido-1,3-dioxane in pure form. The formula of this product is,

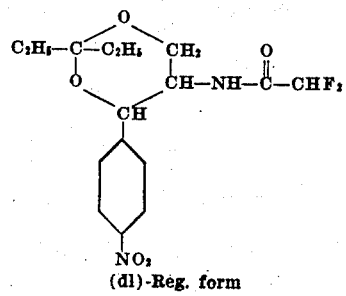

(dl)-Reg. form

Example 10

3 g. of phosphorus pentoxide is added to a solution consisting of 5 g. of propionaldehyde and 5 g. of (dl) - ψ - 1 - p-nitrophenyl-2-β-brompropionamidopropane-1,3-diol and 150 cc. of ethylene dichloride. The reaction mixture is allowed to stand for one-half hour at room temperature under anhydrous conditions and then the liquid decanted from the gummy residue. The solution is stirred with anhydrous sodium carbonate until neutral and then filtered. The filtrate is evaporated to dryness and the residue taken up in and crystallized from dilute methanol. Recrystallization from dilute methanol yields the desired (dl) - ψ - 2 - ethyl-4-p-nitrophenyl-5-β-brompropionamido-1,3-dioxane in pure form. The formula of this product is,

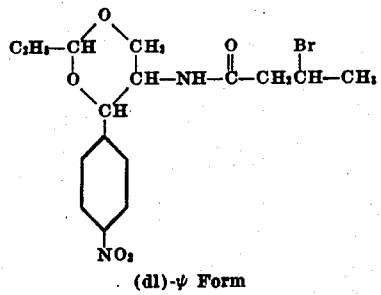

(dl)-ψ Form

What I claim is:

1. A compound of the formula,

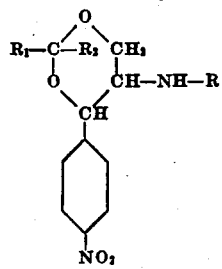

where R is a halogenated lower aliphatic carboxylic acid acyl radical and R₁ and R₂ are members of the class consisting of hydrogen, lower alkyl, phenyl and phenalkyl radicals.

2. A compound of the formula,

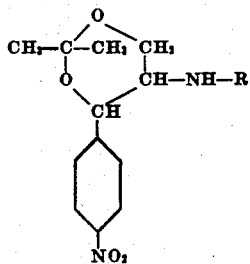

where R is a halogenated lower aliphatic carboxylic acid acyl radical.

3. A compound of the formula,

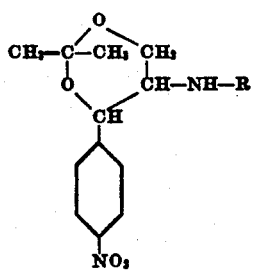

where R is a halogenated acetyl radical.

4. A compound of the formula,

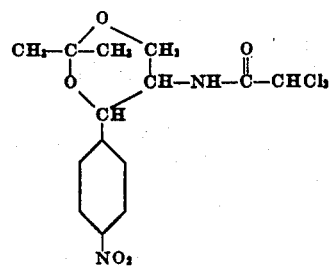

5. (l) - ψ - 2,2-dimethyl-4-p-nitrophenyl-5-dichloroacetamido-1,3-dioxane.

6. (dl) - ψ-2,2-dimethyl-4-p-nitrophenyl-5-dichloroacetamido-1,3-dioxane.

7. (l) - ψ - 2 - methyl-4-p-nitrophenyl-5-dichloroacetamido-1,3-dioxane.

8. Process for obtaining a compound of formula,

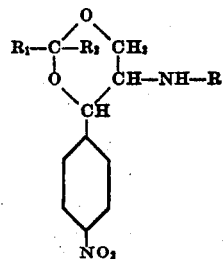

which comprises reacting an acylamido diol compound of formula,

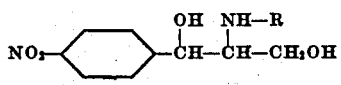

under anhydrous conditions in the presence of a dehydrating agent with a carbonyl compound of formula,

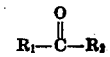

where R is a halogenated lower aliphatic carboxylic acid acyl radical and R₁ and R₂ are members of the class consisting of hydrogen, lower alkyl, phenyl and phenalkyl radicals.

ALLEN C. MOORE.

REFERENCES CITED

The following references are of record in the file of this patent:

UNITED STATES PATENTS

| Number | Name | Date |
|---|---|---|
| 2,247,256 | Senkus | June 24, 1941 |
| 2,305,621 | Kremers | Dec. 22, 1942 |
| 2,307,894 | Mikeska | Jan. 12, 1943 |
| 2,370,586 | Senkus | Feb. 27, 1945 |
| 2,483,885 | Crooks | Oct. 4, 1949 |